United States Patent
Inui

(10) Patent No.: US 7,310,045 B2
(45) Date of Patent: Dec. 18, 2007

(54) RF TAG, RF TAG ATTITUDE DETECTION APPARATUS, AND RF TAG ATTITUDE DETECTION SYSTEM

(75) Inventor: Fuyuki Inui, Asaka (JP)

(73) Assignee: Fujifilm Corporation, Tokyo (JP)

( * ) Notice: Subject to any disclaimer, the term of this patent is extended or adjusted under 35 U.S.C. 154(b) by 222 days.

(21) Appl. No.: 11/099,569

(22) Filed: Apr. 6, 2005

(65) Prior Publication Data

US 2005/0225451 A1    Oct. 13, 2005

(30) Foreign Application Priority Data

Apr. 7, 2004    (JP) .............................. 2004-113270

(51) Int. Cl.
*G08B 13/14*    (2006.01)
(52) U.S. Cl. .............. 340/572.1; 340/10.1; 340/825.49
(58) Field of Classification Search ........... 340/824.49, 340/10.1, 505, 10.4, 686.1, 572.7, 572.1, 340/572.2, 572.4; 342/147, 124, 42; 341/5
See application file for complete search history.

(56) References Cited

U.S. PATENT DOCUMENTS

| | | | | |
|---|---|---|---|---|
| 5,686,902 A | * | 11/1997 | Reis et al. ................. | 340/10.2 |
| 6,956,472 B1 | * | 10/2005 | Walcott et al. .............. | 340/505 |
| 7,005,968 B1 | * | 2/2006 | Bridgelall ................. | 340/10.42 |
| 7,152,040 B1 | * | 12/2006 | Hawthorne et al. ........... | 705/16 |
| 2002/0036569 A1 | * | 3/2002 | Martin ..................... | 340/573.1 |
| 2002/0070863 A1 | * | 6/2002 | Brooking ................. | 340/572.1 |
| 2002/0107445 A1 | * | 8/2002 | Govari ....................... | 600/437 |
| 2003/0076239 A1 | * | 4/2003 | Wenzel et al. ......... | 340/825.49 |

FOREIGN PATENT DOCUMENTS

| | | |
|---|---|---|
| JP | 2002-271229 A | 9/2002 |
| JP | 2003-101550 A | 4/2003 |

\* cited by examiner

*Primary Examiner*—Brent A. Swarthout
(74) *Attorney, Agent, or Firm*—Birch, Stewart, Kolasch & Birch, LLP

(57) ABSTRACT

According to the present invention, the attitude of the article with the RF tag can be automatically detected by detecting the attitude of the directional antenna of the RF tag relative to that of the directional antenna of the RF tag attitude detection apparatus based on the signal intensity of the radio signal received from the RF tag.

14 Claims, 8 Drawing Sheets

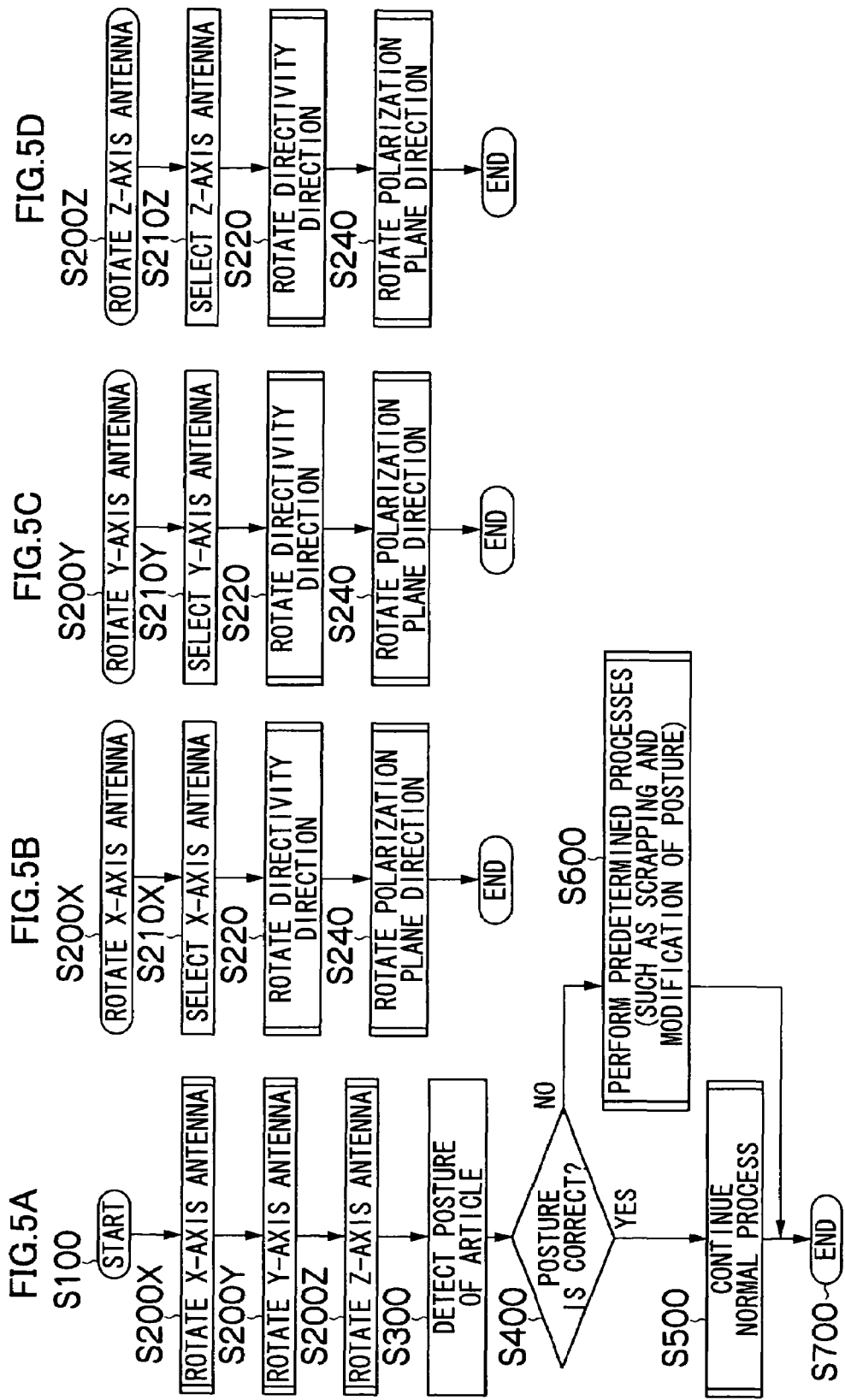

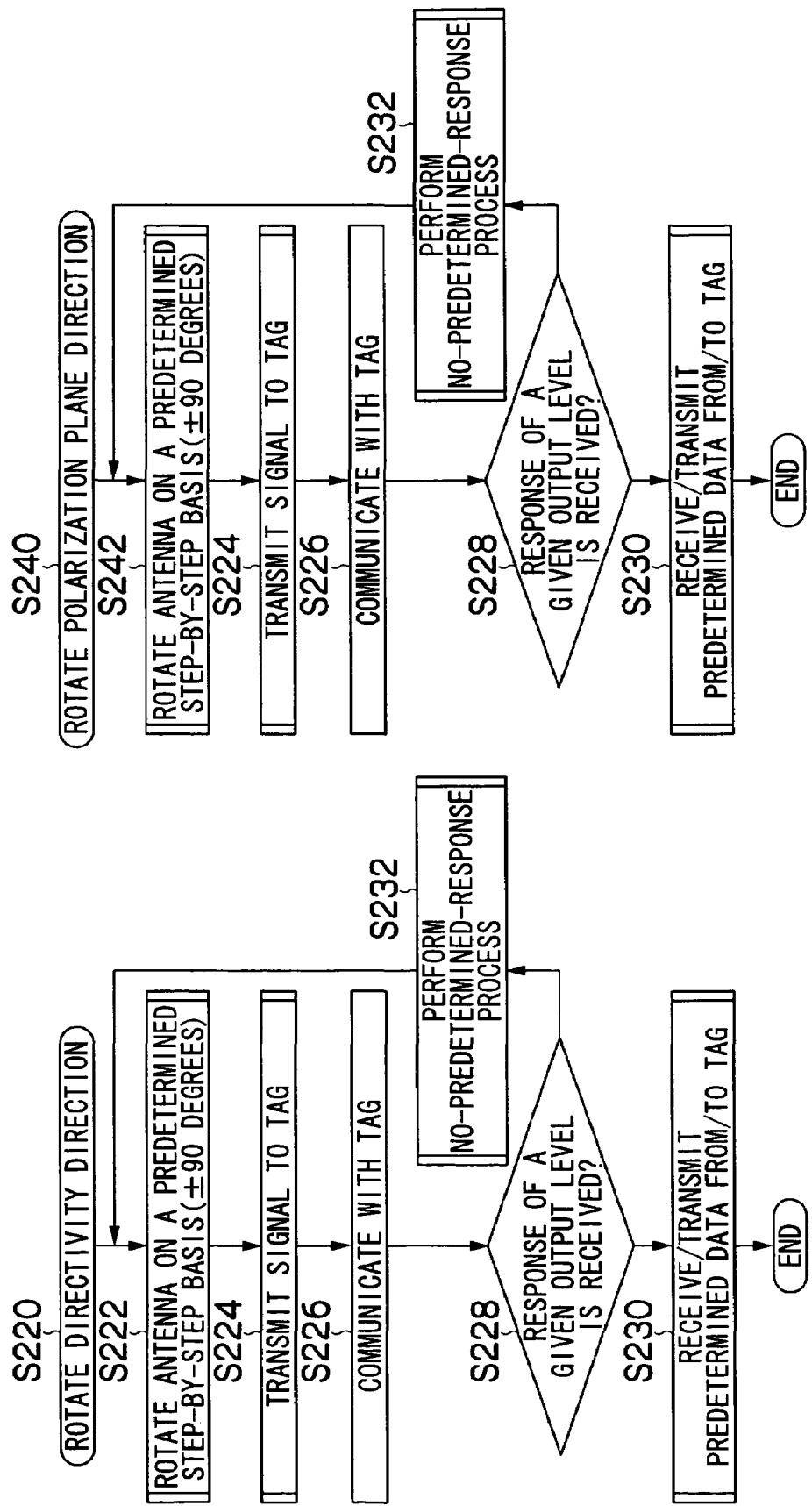

RF TAG, RF TAG ATTITUDE DETECTION APPARATUS, AND RF TAG ATTITUDE DETECTION SYSTEM

BACKGROUND OF THE INVENTION

1. Field of the Invention

The present invention relates to RF tags, and apparatuses and systems using the same, and more particularly to a RF tag attitude detection system for detecting the attitude of an article with a RF tag, and a RF tag and RF tag attitude detection apparatus used in the system.

2. Related Art

Heretofore, there has been proposed a method of retrieving the position of an article by mounting an RF tag (Radio Frequency tag) on the article during the course of distribution to use an RF tag retrieval apparatus equipped with a directional antenna (refer to Japanese Patent Application Laid-open No. 2002-271229). Also, there has been hitherto proposed a method of identifying the position of an article based on a phase difference of response signals from an RF tag (refer to Japanese Patent Application Laid-open No. 2003-101550).

SUMMARY OF THE INVENTION

With these conventional methods, however, the attitude of an article having mounted thereon an RF tag cannot be detected. For example, in order to keep constant or adjust the attitude of an article for which the disposing direction is significant, such as a dead freight having eyebolts for slinging work, measures unrelated to an RF tag must be additionally taken, such as the visual inspection of an operator and the use of an image recognition system.

Also, the conventional RF tags are generally provided with a simple loop antenna; the use of directivity of the antenna for the purpose of detecting the attitude of the RF tag is not taken into consideration.

To address the above issue, an object of the present invention is to provide a RF tag attitude detection system capable of detecting the attitude of an article with an RF tag, and an RF tag and RF tag attitude detection apparatus used in the system.

In order to achieve the above object, an RF tag attitude detection apparatus according to the present invention comprises: a directional antenna which receives/transmits a radio signal from/to an RF tag; an interrogator which measures the signal intensity of the radio signal received from the RF tag via the directional antenna; and a detection section which detects the attitude of the RF tag based on the signal intensity measured by the interrogator.

Preferably, the RF tag attitude detection apparatus comprises a plurality of the directional antennas having a directivity direction or polarization plane direction different from each other, and the detection section compares the signal intensities obtained via the plurality of the directional antennas to detect the attitude of the RF tag.

Preferably, the RF tag attitude detection apparatus further comprises a direction changing section which causes a relative change in the directivity direction and/or polarization plane direction of the directional antenna and the attitude of the RF tag, and the detection section detects the attitude of the RF tag based on the change of the signal intensity associated with the operation of the direction changing section. Preferably, the direction changing section changes the directivity direction and/or polarization plane direction of the directional antenna mechanically or electrically.

Preferably, the RF tag attitude detection apparatus further comprises an antenna having a directivity broader than that of the directional antenna.

Preferably, the interrogator writes into the RF tag the attitude information on the attitude of the RF tag detected by the detection section.

Preferably, the interrogator reads out the attitude information from the RF tag, whereby a process with respect to the RF tag is changed based on the attitude information.

An RF tag according to the present invention comprises a unidirectional antenna.

Preferably, the RF tag further comprises a display section which allows the directivity direction of the antenna to be visually determined from the outside.

Preferably, the antenna is a logperiodic antenna.

An RF tag attitude detection system according to the present invention comprises the above described RF tag attitude detection apparatus and RF tag.

According to the present invention, the attitude of the article with the RF tag can be automatically detected by detecting the attitude of the directional antenna of the RF tag relative to that of the directional antenna of the RF tag attitude detection apparatus based on the signal intensity of the radio signal received from the RF tag.

BRIEF DESCRIPTION OF THE DRAWINGS

FIGS. 5A to 5F are flowcharts showing an embodiment of a control performed when an RF tag attitude detection apparatus operates;

DETAILED DESCRIPTION OF THE PREFERRED EMBODIMENTS

Embodiments of an RF tag, RF tag attitude detection apparatus and RF tag attitude detection system according to the present invention will be described below in detail with reference to the accompanying drawings.

Figure 1:
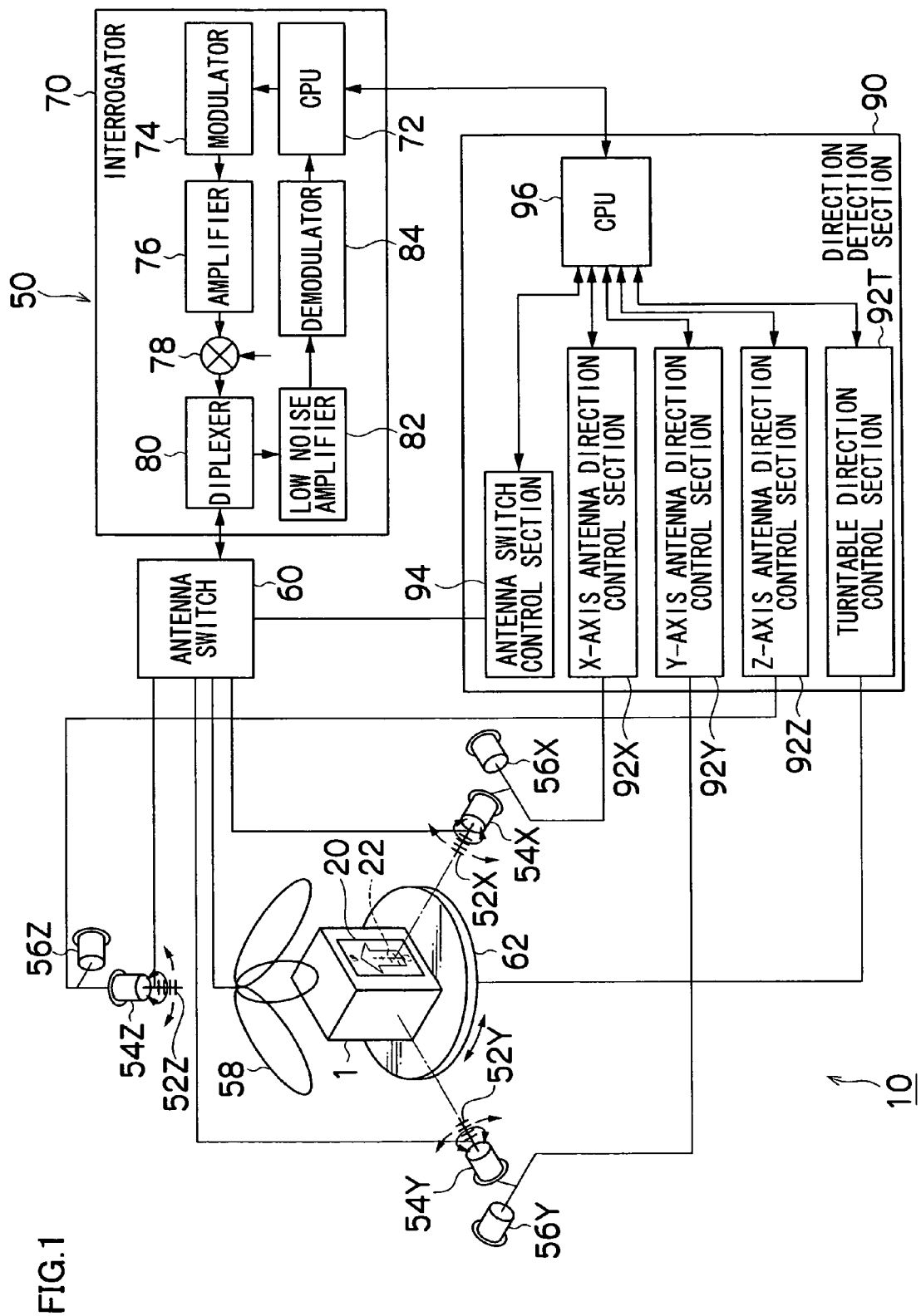
FIG. 1 is a schematic configuration diagram showing an embodiment of an RF tag attitude detection system according to the present invention.

FIG. 1 is a schematic configuration diagram of an RF tag attitude detection system 10 according to an embodiment of the present invention. The RF tag attitude detection system 10 mainly includes: an RF tag 20 which is provided in an article 1 whose attitude is to be detected; an RF tag attitude detection apparatus 50 which detects the attitude of the article 1 provided with the RF tag 20 by wirelessly communicating with the RF tag 20 to detect the attitude of the RF tag 20. Similarly to the conventional RF tags and apparatuses using the same, the RF tag 20 and RF tag attitude detection apparatus 50 also have functions such as transmitting/receiving of, for example, the ID information of the RF tag 20 or the information on the article 1.

Figure 2A:
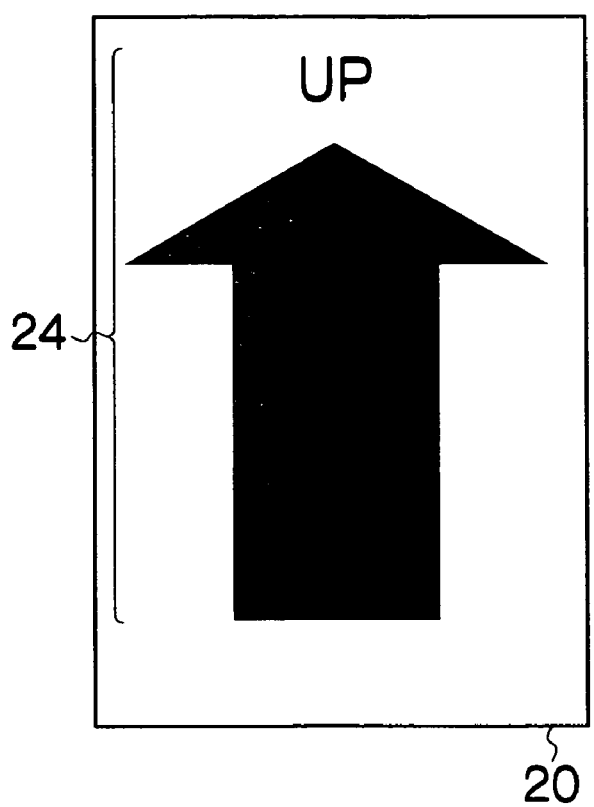
FIGS. 2A and 2B are schematic diagrams showing an exterior appearance and internal structure of an RF tag.
Figure 2B:
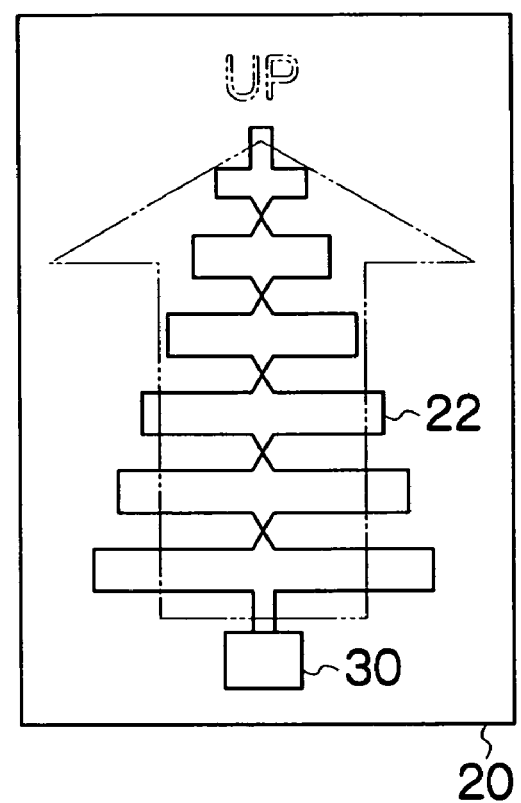

FIG. 2A is a schematic diagram showing an external appearance of the RF tag 20. FIG. 2B is a schematic diagram showing an internal structure of the RF tag 20. As shown in FIGS. 2A and 2B, the RF tag 20 includes a directional antenna 22 and IC chip 30 connected to the directional antenna 22. In the exterior section of the RF tag 20, there is provided a display section 24 which allows the directivity direction of the directional antenna 22 to be determined from the outside. The directional antenna 22 is preferably a planar unidirectional loop antenna such as a logperiodic antenna as shown in FIG. 2B. Alternatively, the directional antenna 22 may be a unidirectional antenna based on another principle, such as a Yagi-Uda antenna. Any antenna, irrespective of its principle, cannot have ideal isotropy, and inevitably has some directivity. Thus, even when not unidirectional, any antenna can be used as the directional antenna 22.

Figure 3:
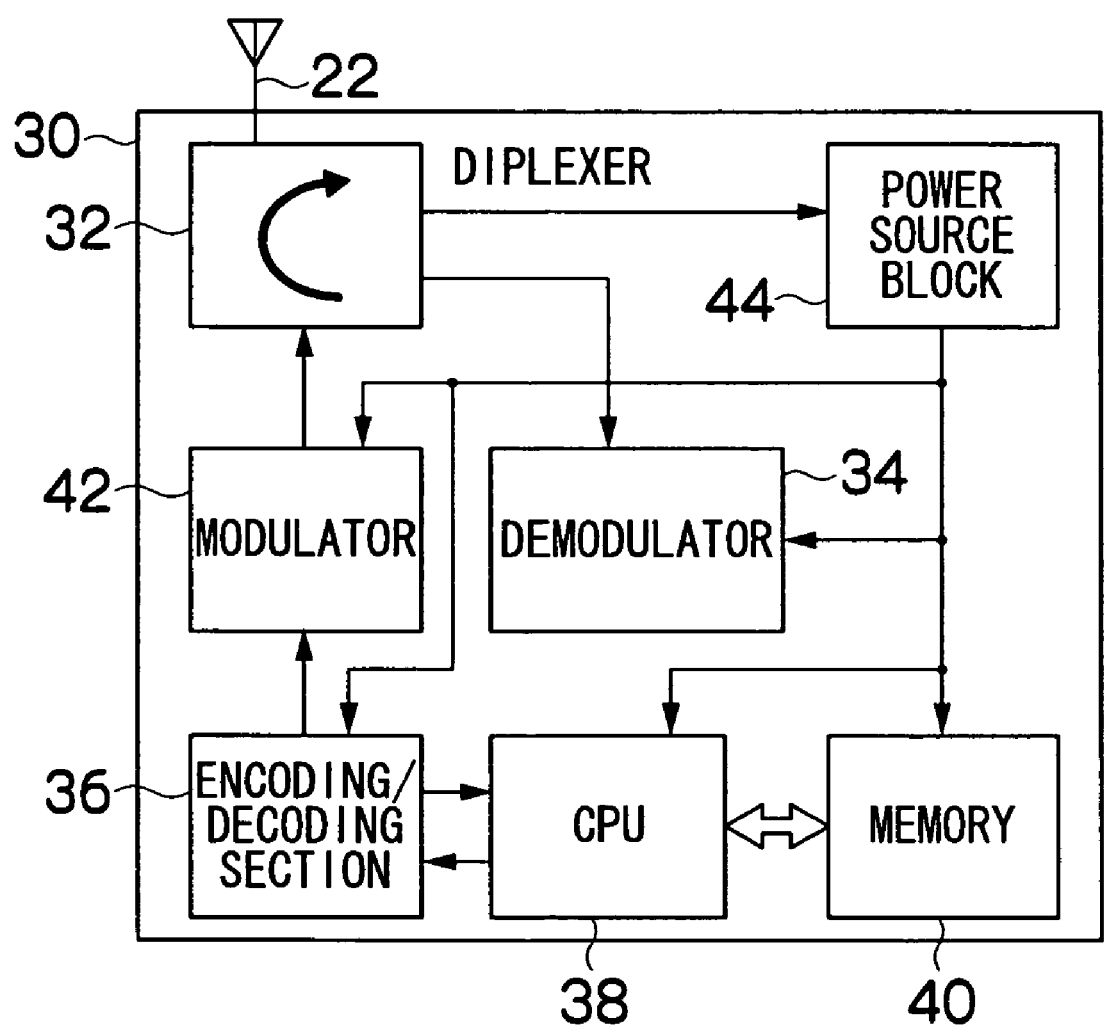
FIG. 3 is a block diagram of the RF tag.

FIG. 3 is a block diagram of the RF tag 20. A radio signal received by the directional antenna 22 is branched by a diplexer 32 being a bandpass filter to branch transmitting/receiving signals, and is demodulated by a demodulator 34, and then is decoded by an encoding/decoding section 36. A CPU 38 reads the decoded signal as a command, and stores the read signal into a memory 40. A response signal from the CPU 38 is encoded by the encoding/decoding section 36, and is modulated by a modulator 42, and then is transmitted from the directional antenna 22 via the diplexer 32. A power source block 44 generates electric power from the radio signal received via the diplexer 32 and supplies the electric power to each section of an IC chip 30.

Figure 4C:
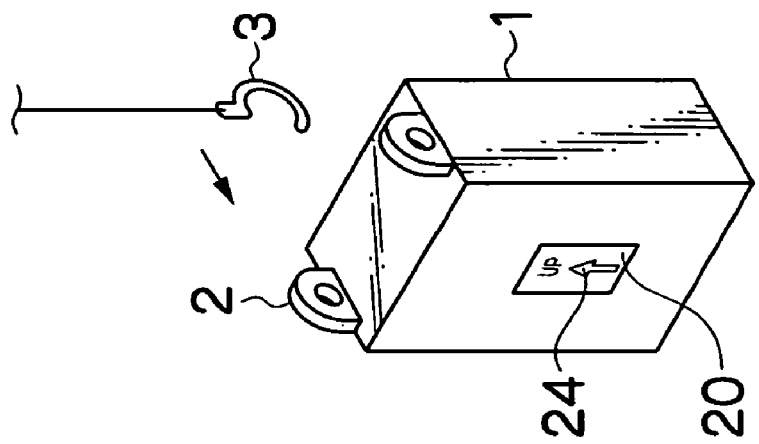
FIGS. 4A to 4C are schematic diagrams explaining the attitude of an article with the RF tag.
Figure 4B:
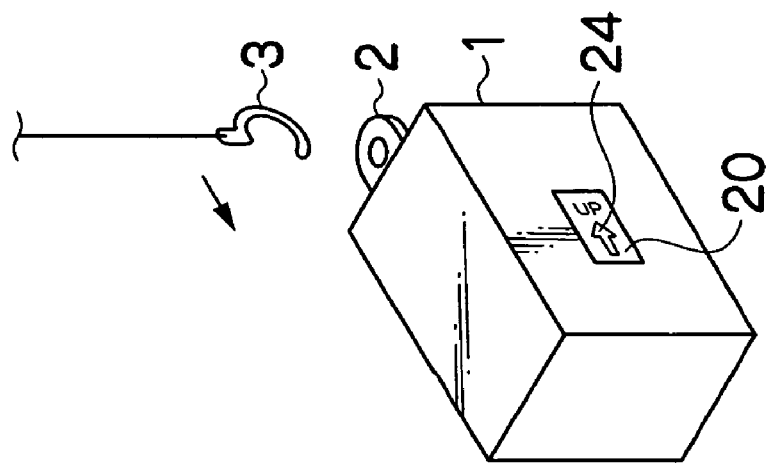
Figure 4A:
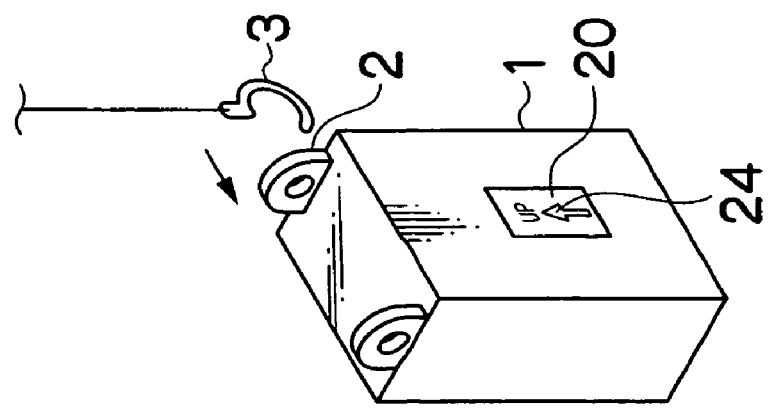

FIGS. 4A to 4C are schematic diagrams explaining the attitude of an article 1 with the RF tag 20. FIG. 4A shows an exemplary desirable attitude of the article 1; FIGS. 4B and 4C each show an exemplary undesirable attitude of the article 1. For example, when the article 1 is a dead freight with eyebolts 2 for slinging work, the attitude of the article 1 must be adjusted so that a hook 3 can be easily hung on the eyebolts 2. For this purpose, the RF tag 20 is attached to the surface of the article 1 so that the display section 24 indicates the desirable attitude direction of the article 1, and the directivity direction and polarization plane direction (i.e. the attitude of the RF tag 20) of the directional antenna 22 of the RF tag 20 is, as described later, detected by the RF tag attitude detection apparatus 50 whereby the attitude of the RF tag 20 (and that of the article 1 with the RF tag 20) can be automatically detected. In addition, similarly to a conventional luggage tag, the display section 24 of the RF tag 20 can call operator's attention to the attitude of the article 1. In a case where the visibility from the operator need not to be increased by the display section 24, such as when the desirable attitude direction of the article 1 is evident from the outer shape of the article 1, all what is required is that the attitude of the RF tag 20 and the desirable attitude direction of the article 1 should have a predetermined relationship with each other. In this case, the RF tag 20 may not include the display section 24; the RF tag 20 may be incorporated or embedded into the interior of the article 1.

The RF tag attitude detection apparatus 50 will now be described with reference to FIG. 1. The RF tag attitude detection apparatus 50 mainly includes: directional antennas 52X, 52Y and 52Z which receive/transmit radio signals from/to the RF tag 20 attached to the article 1 placed on a turntable 62; the interrogator 70 which inputs/outputs signals from/to the RF tag 20 via each antenna; and the direction detection section 90 which selects an antenna to be used from among the antennas, and at the same time detects the attitude of the RF tag 20 (and that of the article 1 with the RF tag) based on the signal intensity of the radio signal received from the RF tag 20 via the interrogator 70 while causing a relative change in the directivity direction and polarization plane direction of the directional antennas 52X, 52Y and 52Z and the attitude of the article 1 (i.e. that of the RF tag 20 attached to the article 1).

The directional antennas 52X, 52Y and 52Z (hereinafter, sometimes referred to as X-axis antenna 52X, Y-axis antenna 52Y, and Z-axis antenna 52Z, respectively) are disposed on each axis of an XYZ orthogonal coordinate system with its origin at a point (hereinafter, referred to as an object point) at which the probability of finding the RF tag 20 attached to the article 1 placed on the turntable 62 is highest. In an initial state, the directional antennas have a directivity which extends in the object point direction along each axis. The X-axis antenna 52X includes: a polarization plane direction rotator 54X which axially rotates the X-axis antenna 52X to rotate only the polarization plane direction of the X-axis antenna 52X without changing the directivity direction thereof; and a directivity direction rotator 56X which rotates the X-axis antenna 52X and polarization plane direction rotator 54X along the XY plane to rotate the directivity direction of the X-axis antenna 52X. Similarly, the Y-axis antenna 52Y includes: a polarization plane direction rotator 54Y which axially rotates the Y-axis antenna 52Y; and a directivity direction rotator 56Y which rotates the Y-axis antenna 52Y and polarization plane direction rotator 54Y along the XY plane. Also, similarly, the Z-axis antenna 52Z includes: a polarization plane direction rotator 54Z which axially rotates the Z-axis antenna 52Z; and a directivity direction rotator 56Z which rotates the Z-axis antenna 52Z and polarization plane direction rotator 54Z along the XZ plane.

In addition to the directional antennas 52X, 52Y and 52Z, the RF tag attitude detection apparatus 50 includes a broad directional antenna 58 which has a directivity broader than that of each directional antenna. Irrespective of the directivity direction and polarization plane direction of the directional antenna 22 of the RF tag 20, the broad directional antenna 58 holds communication with the RF tag 20 and at the same time supplies electrical power to the RF tag 20. The broad directional antenna 58 is preferably a large one or a complex of multiple antennas so as to cover the whole of that space on the turntable 62 in which the RF tag 20 can be located. Also, the broad directional antenna 58 is further preferably a circular polarization antenna.

The directional antennas 52X, 52Y and 52Z are selectively connected to the interrogator 70 via an antenna switch 60. The broad directional antenna 58 is connected to the interrogator 70 via the antenna switch 60; this connection can be severed as required. The broad directional antenna 58 may be connected to the interrogator 70 at all times without the use of the antenna switch 60.

A command outputted from a CPU 72 of the interrogator 70 is modulated and frequency-converted by a modulator 74, is amplified by an amplifier 76, and then is mixed with a power carrier wave by a mixer 78, is transmitted as a radio signal from one of the directional antennas 52X, 52Y and 52Z, and/or from the broad directional antenna 58 via a diplexer 80 and the antenna switch 60. A radio signal received by the directional antennas 52X, 52Y and 52Z and the broad directional antenna 58 is inputted to a low-noise amplifier 82 via the antenna switch 60 and diplexer 80 to be amplified, and then is frequency-converted and demodulated by a demodulator 84, and is read as a response signal by the CPU 72.

A direction detection section 90 mainly includes: an X-axis antenna direction control section 92X which drives the polarization plane direction rotator 54X and directivity direction rotator 56X to control the directivity direction and polarization plane direction of the X-axis antenna 52X; a Y-axis antenna direction control section 92Y which drives the polarization plane direction rotator 54Y and directivity direction rotator 56Y to control the directivity direction and polarization plane direction of the Y-axis antenna 52Y; a Z-axis antenna direction control section 92Z which drives the polarization plane direction rotator 54Z and directivity direction rotator 56Z to control the directivity direction and polarization plane direction of the Z-axis antenna 52Z; a turntable direction control section 92T which drives the turntable 62 to control the direction of the article 1 (and that of the RF tag 20 attached to the article 1); an antenna switch control section 94 which controls the antenna switch 60 to select an antenna to be used.

While changing an antenna to be used and the directivity direction and polarization plane direction thereof via each control section, the CPU 96 receives from the CPU 72 the information representing the signal intensity of the radio signal received from the RF tag 20 by the interrogator 70, and detects the attitude of the RF tag 20 (and that of the article 1 with the RF tag 20) based on the information. In order to acquire the information representing the signal intensity of the radio signal received from the RF tag 20, for example, the CPU 72 may directly measure the signal intensity by measuring the voltage of an input signal or output signal of the low-noise amplifier 82, or alternatively may indirectly measure the signal intensity by measuring the error rate of a response signal demodulated by the demodulator 84.

FIGS. 5A to 5F are flowcharts of the attitude detection of the article 1 by the RF tag attitude detection apparatus 50 according to the embodiment; FIG. 5A shows a main flow; FIGS. 5B, 5C, 5D, 5E and 5F show the subroutines thereof, respectively. The same reference numerals are applied to corresponding processes, and an explanation thereof is omitted. When a attitude detection process of the article 1 is initiated (S100), an X-axis antenna rotation (S200X), Y-axis antenna rotation (S200Y) and Z-axis antenna rotation (S200Z) are sequentially performed so that the attitude of the article 1 is detected based on the information obtained in each process, which represents the signal intensity of a radio signal received from the RF tag 20 (S300). Subsequently, it is determined whether or not the detected attitude of the article 1 is a predetermined one (S400). If so, a normal operation is continued (S500), and the processing is terminated (S700). If not, predetermined processes, such as the scrapping of the article 1 and the modification of the attitude, are performed (S600), and the processing is terminated (S700).

In a case where the article 1 is, for example, an article which is not allowed to be tumbled, such as a box packing a decorated cake, when it is determined in S400 that the article 1 has been tumbled, a tumble history may be written into the RF tag 20 by the interrogator 70; the article 1 with the RF tag 20 into which the tumble history is written is to be scrapped or handled as a low-priced article. In this case, there may be further provided a step of reading the tumble history from the RF tag 20 by the interrogator 70, which step is subsequent to S100, whereby the subsequent processes are modified with respect to the RF tag 20 (and the article 1 with the RF tag 20) into which the tumble history is written.

Also, in a case where the article 1 is, for example, an article for which the disposing direction is significant, such as a dead freight having eyebolts 2 for slinging work, when it is determined in S400 that the detected attitude of the article 1 is not a predetermined one, a alarm may be issued to instruct the operator to change the attitude of the article 1 to the predetermined one. Alternatively, an automatic change of the attitude of the article 1 by, for example, the turntable 62 or a robot arm (not shown), and the attitude detection process may be repeated until it is determined in S400 that the detected attitude of the article 1 is the predetermined one.

In an X-axis antenna rotation (S200X) (refer to FIG. 5B), the X-axis antenna 52X is connected to the interrogator 70 via the antenna switch 60 (S210X), and then a directivity direction rotation (S220) and polarization plane direction rotation (S240) of the X-axis antenna 52X are sequentially performed. Processes of a Y-axis antenna rotation (S200Y) and Z-axis antenna rotation (S200Z) (refer to FIGS. 5C and 5D) are similar to those of the X-axis antenna rotation (S200X).

Taking as an example a case where the X-axis antenna 52X is selected, the antenna directivity direction rotation (S220) (refer to FIG. 5E) will be described. Firstly, while the directivity direction of the X-axis antenna 52X is rotated on a predetermined step-by-step basis (limited angle: ±90 degrees) by the directivity direction rotator 56X (S222), a radio signal is transmitted to the RF tag 20 via the X-axis antenna 52X (S224) to communicate with the RF tag 20 (S226). In this case, in S224 and S226, one of the transmitting of the radio signal to the RF tag 20 and the reception of the radio signal from the RF tag 20 may be performed via the broad directional antenna 58. Subsequently, it is determined whether nor not a response of a given output level is received from the RF tag 20 in S226 (S228). If so, a predetermined data communication with the RF tag 20 is performed (S230). If not, a no-predetermined-response process is performed (S232), and the flow is returned to S222 so that the directivity direction of X-axis antenna 52X is rotated by one predetermined step by the directivity direction rotator 56X, and the process S224 and subsequent processes are performed. From the above described processes, there can be obtained the information representing the relationship between the change of directivity direction of the X-axis antenna 52X and that of the intensity of the radio signal received from the RF tag 20. A process for a case where the Y-axis antenna 52Y or Z-axis antenna 52Z is selected is similar to that for the case where the X-axis antenna 52X is selected.

Taking as an example a case where the X-axis antenna 52X is selected, the antenna polarization plane direction rotation (S240) (refer to FIG. 5F) will be described. This process is quite similar to the process of the antenna directivity direction rotation (S220) except that the polarization plane direction of the X-axis antenna 52X is rotated by the polarization plane direction rotator 54X in S242. From this process, there can be obtained the information representing the relationship between the change of polarization plane direction of the X-axis antenna 52X and that of the intensity of the radio signal received from the RF tag 20. A process for a case where the Y-axis antenna 52Y or Z-axis antenna 52Z is selected is similar to that for the case where the X-axis antenna 52X is selected.

From the above described processes, there can be obtained the information representing the relationship between (A) the selection from among the directional antennas and the change of directivity direction and polarization plane direction of the directional antenna and (B) the change of signal intensity of the radio signal received from the RF tag 20. Based on the information, the attitude of the article 1 is detected.

A power carrier wave may be transmitted from the broad directional antenna 58 to supply electric power to the RF tag 20 during the process of detecting the attitude of the article 1. Alternatively, the broad directional antenna 58 may not be used at all during the process of detecting the attitude of the article 1, and may be used only for the purpose of communicating with the RF tag 20 independently of the process of detecting the attitude of the article 1.

Also, instead of rotating the directional antennas 52X, 52Y and 52Z, the article 1 may be rotated by, for example, the turntable 62 or the like. When the article 1 is not required to be rotated, the turntable 62 is unnecessary.

When the attitude of the article 1 is not required to be finely detected, the steps of the directivity direction rotation and polarization plane direction rotation of the directional antennas 52X, 52Y and 52Z, and the mechanism for the steps may be omitted. Also, the number of directional antennas may be reduced to one at least. Even in this case, it is possible to determine whether or not the attitude of the article 1 is in a predetermined direction.

Figure 6:
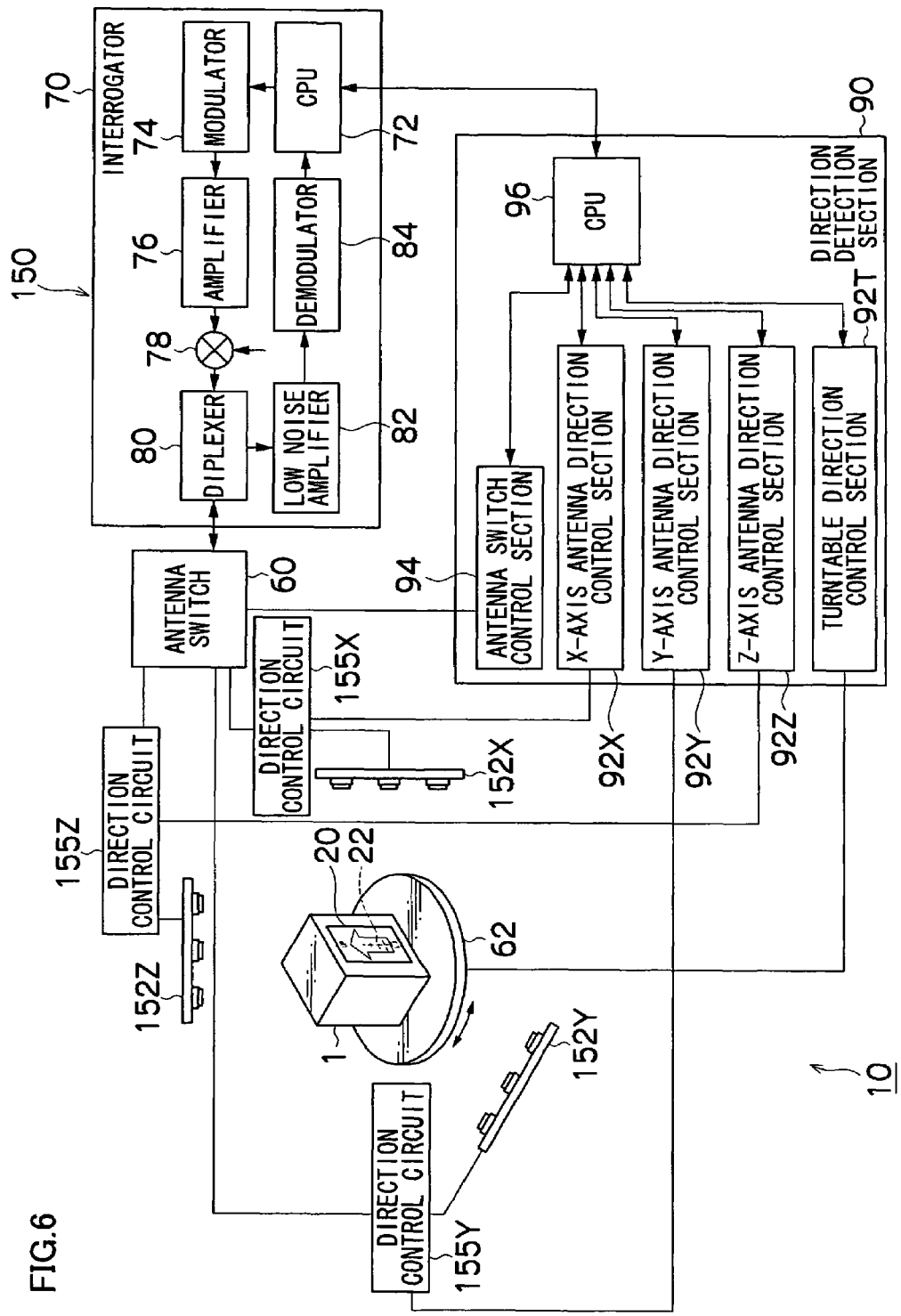
FIG. 6 is a schematic configuration diagram showing a second embodiment of the RF tag attitude detection apparatus.

FIG. 6 is a schematic configuration diagram of an RF tag attitude detection apparatus 150 according to a second embodiment of the present invention. In FIG. 6, the same reference numerals are applied to constituent elements corresponding or similar to those of the RF tag attitude detection apparatus 50 shown in FIG. 1, and an explanation thereof is omitted. The RF tag attitude detection apparatus 150 includes antenna arrays 152X, 152Y and 152Z, and direction control circuits 155X, 155Y and 155Z, which serve as directional antennas and devices which rotate the directivity direction and polarization plane direction thereof.

Figure 7:
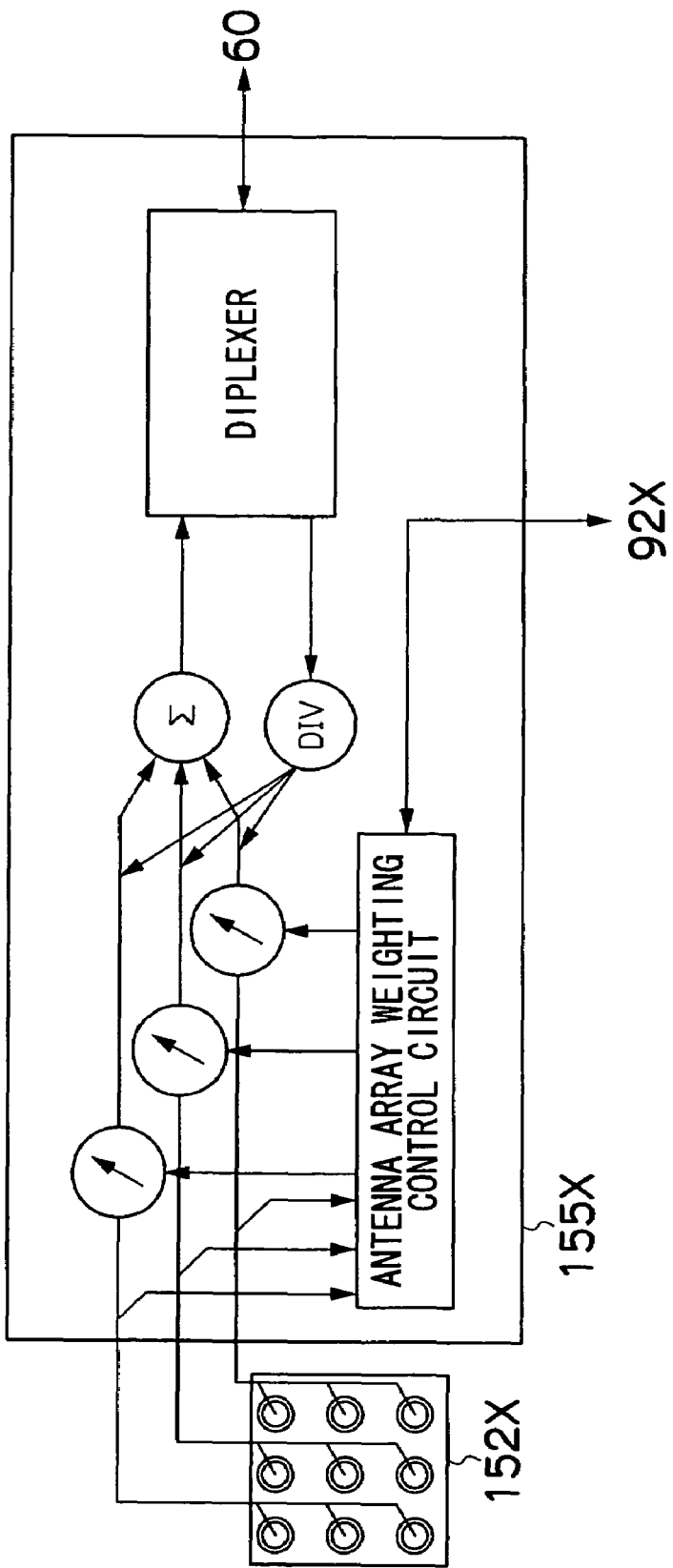
FIG. 7 is a block diagram of an antenna array and a direction control circuit.

FIG. 7 is a block diagram of the antenna array 152X and direction control circuit 155X. The antenna arrays 152Y and 152Z, and the direction control circuits 155Y and 155Z have a configuration similar to that of the antenna array 152X and direction control circuit 155X. The antenna array 152X has multiple antenna elements arranged in a planar manner at a given interval. The direction control circuit 155X can control arbitrarily the directivity direction and polarization plane direction of the antenna array 152X by transmitting/receiving signals obtained by performing weighting or creating phase difference with respect to each antenna element.

The process of detecting the attitude of the article 1 by the RF tag attitude detection apparatus 150 configured as above described is similar to that described with reference to FIGS. 5A to 5F except that the directivity direction and polarization plane direction of the antennas are electrically rotated without rotating mechanically the antennas. In addition, with the RF tag attitude detection apparatus 150, the control of broadening the directivity of each antenna array or of switching to circular polarization can be performed electronically by the direction control circuit. Thus, for example, in the X-axis antenna rotation process, the antenna array 152X and direction control circuit 155X may be made to operate similarly to the directional antenna 52X, polarization plane direction rotator 54X and directivity direction rotator 56X, and at the same time the antenna array 152Y and direction control circuit 155Y, and the antenna array 152Z and direction control circuit 155Z may be made to operate similarly to the broad directional antenna 58. Also, other than during the process of detecting the attitude of the article 1, the directivity may be broadened, or a switching to circular polarization may be performed with respect to all the antenna arrays.

What is claimed is:

1. An RF tag orientation detection apparatus, comprising:
a directional antenna which receives/transmits a radio signal from/to an RF tag;
an interrogator which measures the signal intensity of the radio signal received from the RF tag via the directional antenna; and
a detection section which detects the orientation of the RF tag in a reference coordinate system based on the signal intensity measured by the interrogator, the reference coordinate system having its origin at a point at which a probability of finding the RF tag attached to an article in the coordinate system is highest.

2. The RF tag orientation detection apparatus according to claim 1, further comprising a plurality of the directional antennas having a directivity direction or polarization plane direction different from each other,
wherein the detection section compares the signal intensities obtained via the plurality of the directional antennas to detect the attitude orientation of the RF tag.

3. The RF tag orientation detection apparatus according to claim 1, further comprising a direction changing section which causes a relative change in at least one of the directivity direction and polarization plane direction of the directional antenna and the orientation of the RF tag,
wherein the detection section detects the orientation of the RF tag based on the change of the signal intensity associated with the operation of the direction changing section.

4. The RF tag orientation detection apparatus according to claim 2, further comprising a direction changing section which causes a relative change in at least one of the directivity direction and polarization plane direction of the directional antenna and the orientation of the RF tag,
wherein the detection section detects the orientation of the RF tag based on the change of the signal intensity associated with the operation of the direction changing section.

5. The RF tag orientation detection apparatus according to claim 3, wherein the direction changing section changes electronically or mechanically at least one of the directivity direction and polarization plane direction of the directional antenna.

6. The RF tag orientation detection apparatus according to claim 4, wherein the direction changing section changes electronically or mechanically at least one of the directivity direction and polarization plane direction of the directional antenna.

7. The RF tag orientation detection apparatus according to claim 1, further comprising an antenna having a directivity broader than that of the directional antenna.

8. The RF tag orientation detection apparatus according to claim 6, further comprising an antenna having a directivity broader than that of the directional antenna.

9. An RF tag attitude detection apparatus, comprising:
a directional antenna which receives/transmits a radio signal from/to an RF tag;
an interrogator which measures the signal intensity of the radio signal received from the RF tag via the directional antenna; and
a detection section which detects the attitude of the RF tag based on the signal intensity measured by the interrogator, wherein
the interrogator writes into the RF tag the attitude information on the attitude of the RF tag detected by the detection section.

10. An RF tag attitude detection apparatus, comprising:
a directional antenna which receives/transmits a radio signal from/to an RF tag;
an interrogator which measures the signal intensity of the radio signal received from the RF tag via the directional antenna;
a detection section which detects the attitude of the RF tag based on the signal intensity measured by the interrogator;
a plurality of the directional antennas having a directivity direction or polarization plane direction different from each other; and
a direction changing section which causes a relative change in at least one of the directivity direction and/or polarization plane direction of the directional antenna and the attitude of the RF tag, wherein
the detection section detects the attitude of the RF tag based on the change of the signal intensity associated with the operation of the direction changing section,
the direction changing section changes electronically or mechanically at least one of the directivity direction and polarization plane direction of the directional antenna, and
the interrogator writes into the RF tag the attitude information on the attitude of the RF tag detected by the detection section.

11. The RF tag attitude detection apparatus according to claim 9, wherein the interrogator reads out the attitude information from the RF tag, whereby a process with respect to the RF tag is changed based on the attitude information.

12. The RF tag attitude detection apparatus according to claim 10, wherein the interrogator reads out the attitude information from the RF tag, whereby a process with respect to the RF tag is changed based on the attitude information.

13. An RF tag orientation detection system comprising the RF tag orientation detection apparatus of claim 1, and an RF having a unidirectional antenna.

14. An RF tag orientation detection system comprising the RF tag attitude detection apparatus of claim 12, and an RF tag having a logperiodic antenna.

* * * * *